United States Patent [19]

Funke

[11] 4,158,681
[45] Jun. 19, 1979

[54] SINTERING NUCLEAR FUEL PELLETS

[75] Inventor: Peter Funke, Rodenbach, Fed. Rep. of Germany

[73] Assignee: ALKEM GmbH, Hanau, Fed. Rep. of Germany

[21] Appl. No.: 777,129

[22] Filed: Mar. 14, 1977

[30] Foreign Application Priority Data

Mar. 19, 1976 [DE] Fed. Rep. of Germany ....... 2611750

[51] Int. Cl.² ........................................... G21C 21/00
[52] U.S. Cl. .............................. 264/0.5; 252/301.1 R
[58] Field of Search .................. 264/0.5; 252/301.1 R, 252/301.1 S

[56] References Cited

U.S. PATENT DOCUMENTS

| 3,668,285 | 6/1972 | DeFreitas et al. | 264/0.5 |
| 3,673,101 | 6/1972 | McKenny, Jr. et al. | 264/0.5 X |
| 3,692,887 | 9/1972 | Flipot | 264/0.5 |
| 3,714,061 | 1/1973 | Triggiani et al. | 252/301.1 S |
| 3,766,082 | 10/1973 | Tennery et al. | 252/301.1 R |
| 3,829,552 | 8/1974 | Reed | 252/301.1 R |
| 3,927,154 | 12/1975 | Carter | 264/0.5 |
| 3,930,787 | 1/1976 | DeHollander et al. | 264/0.5 X |

Primary Examiner—Peter A. Nelson
Attorney, Agent, or Firm—Herbert L. Lerner

[57] ABSTRACT

Sintering nuclear fuel pellets of nuclear fuel oxides having oxygen in stoichiometric excess of the dioxides by passing the nuclear fuel pellets through a reduction furnace having a reducing atmosphere under regulated exposure time or residence time to produce reduced nuclear fuel oxides of desired oxygen content. The reduced pellets are cooled and sent to an intermediate station for checking or holding. The cooled pellets from the intermediate station are sent through a sintering furnace with means for independently regulating the exposure time or residence time in the sintering furnace. Additional features are the independent control of the atmospheres and temperature as well as the humidity concentration in each furnace. Less expensive nitrogen gas may efficiently be used in the process.

17 Claims, 1 Drawing Figure

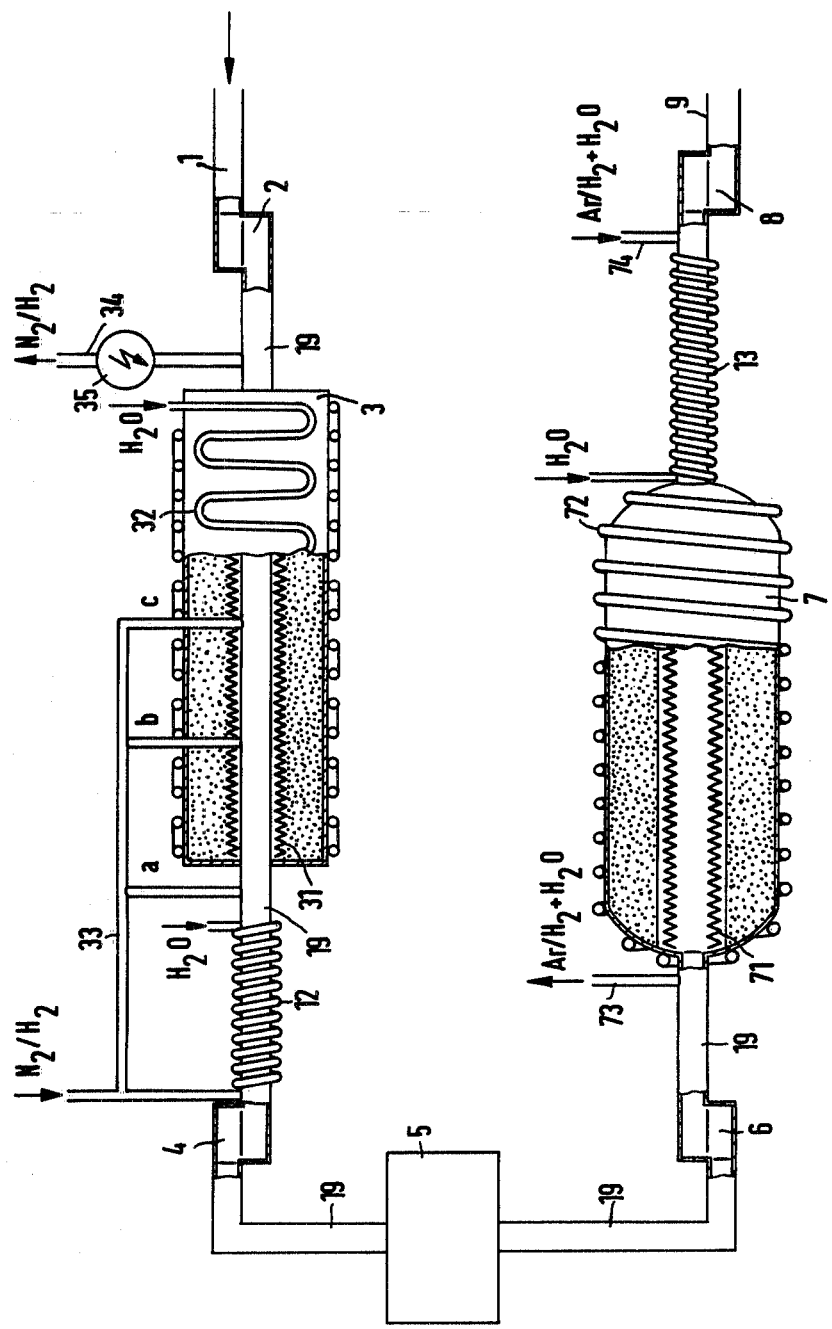

SINTERING NUCLEAR FUEL PELLETS

BACKGROUND OF THE INVENTION

1. Field of the Invention

The present invention relates to sintering nuclear fuel and more particularly refers to a new method and apparatus for sintering pellets of nuclear fuel oxides and mixtures of nuclear fuel oxides in a reducing furnace atmosphere.

2. Description of the Prior Art

Nuclear fuel is understood here to mean uranium, plutonium and thorium, alone or in mixture. For the sake of simplification, however, only uranium dioxide will be mentioned in the following discussion.

Nuclear fuel pellets are manufactured in a known manner by pressing powdered $UO_{2+x}$ in which oxygen is in stoichiometric excess of the dioxide and/or mixtures of $UO_{2+x}$ containing oxygen in stoichiometric excess and powdered $PuO_2$ to form pressed blanks of various geometry. These pressed blanks or pellets are produced either without the addition of binder and lubricating agents in pressing tools automatically lubricated with lubricating oil of differing origin, or with the addition of binder and lubricating agents such as, for example, Zn stearate, Zn behenate, paraffins or similar materials.

After pressing, the formed blanks or pellets are placed in highly heat-resistant transport containers, called transport boats. The laden boats are pushed through a resistance-heated push-through sintering furnace lined with highly refractory blocks, where the stoichiometric excess oxygen of the $UO_{2+x}$ is first reduced to stoichiometric $UO_{2.00}$ in reducing gases such a hydrogen and/or rare gas/hydrogen or nitrogen/hydrogen mixtures; and the pressed blanks or pellets sintered at temperatures of about 1700° C. to form dense, stable pellets.

In the special case of manufacturing sintered $UO_2$/$PuO_2$ bodies for light-water reactors and breeder reactors, a gas mixture which maximally contains only 8% hydrogen is used for the reduction of stoichiometric excess oxygen $UO_{2+x}$ for safety reasons (possible formation of explosive oxygen-$H_2$ mixtures).

As a result of this lower hydrogen concentration in the gas mixture, the reduction potential of the gas mixture (as expressed as partial free enthalpy of the oxygen and thus, in the system $H_2$/$H_2O$, proportional to the $H_2$/$H_2O$ ratio) is greatly lowered as compared to pure hydrogen. This lower reduction potential leads to a considerable lengthening of the reduction time and, with the sintering furnace following directly, to an equivalent lengthening of the sintering time.

The reaction water produced in the reaction lowers the reduction potential further, as the water concentration in the gas increases. For the gas mixture still to have a reducing effect, the $H_2$/$H_2O$ partial pressure ratio should not become lower than 10:1. In order to compensate for this change of the reduction potential, which itself is again proportional to the amount of oxide reduced per unit time, dry fresh gas can be introduced into the furnace. For throughputs of, say, 12 kg $UO_{2.2}$/hour, a total of 35 m$^3$ of gas mixture is flushed through the furnace per hour, so that the ratio $H_2$/$H_2O$ does not drop below 10:1.

In sintering the $UO_2$/$PuO_2$ fuel pellets, an overall stoichiometric oxygen deficient oxide, caused by the reduction of the Pu(IV) to Pu(III), can be produced at the prevailing high temperatures. Depending on the intended application, whether in a light-water reactor or in a breeder reactor, either a stoichimetric or a stoichiometric deficient oxide is desired. To adjust the respective desired stoichiometry, it is necessary to adjust a respectively different reduction potential in the high-temperature portion of the furnace. This is adjusted by humidifying the fresh gas entering the furnace to previously calculated water concentrations.

The requirements which are thus obtained for the process technique with respect to the reduction potential in the reduction and sintering portion of the push-through furnace are therefore contradictory.

If the inexpensive nitrogen/hydrogen mixture is used for the reduction and the sintering, one finds excessive contamination of the nuclear fuel by nitrogen. This can be reduced by a heat treatment at T > 1000° C. in rare gases or rare gas/hydrogen mixtures. Of necessity this leads to using only the expensive rare gas/hydrogen mixture as the reduction and sintering gas, if only one gas mixture is used for both parts of the furnace.

SUMMARY OF THE INVENTION

An object of the present invention is to provide a method, in which during the reduction of the pressing blanks containing oxygen in stoichiometric excess, a strong reducing gas can be used, i.e., a gas as dry as possible is flushed through the furnace in large quantities.

Another object of the invention is to provide a method of reducing pressing blanks or pellets with the use of a relatively inexpensive gas mixture, particularly in view of the necessarily large amount of gas.

A further object of the invention is to provide a method for using a gas mixture in the high-temperature zone, which can be adjusted to a different reduction potential lower than that in the reduction zone dependent on the different applications.

A still further object of the present invention is to provide a method for use of a rare gas/hydrogen mixture as the gas mixture for cooling the sintered body to T < 1000° C.

With the foregoing and other objects in view, there is provided in accordance with the invention a method for sintering nuclear fuel oxides and mixtures of nuclear fuel oxides having oxygen in stoichiometric excess of the dioxides in a reducing furnace atmosphere, which includes passing the nuclear fuel pellets run through a heated reduction furnace with a reducing atmosphere to effect reduction of at least substantially all the excess oxygen, regulating the residence time of the nuclear fuel oxides in the reducing furnace to produce reduced nuclear fuel oxides of desired oxygen content, cooling the reduced nuclear fuel oxides, passing the cooled-down nuclear fuel oxides to an intermediate station, subsequently passing the cooled-down nuclear fuel oxides through a sintering furnace, and independently regulating the residence time of the nuclear fuels oxides passing through the sintering furnace to effect sintering of the nuclear fuel pellets.

The nuclear fuel pellets are treated in the two separated furnaces at different temperatures and the gas atmospheres in the two furnaces are independent of each other and have different compositions.

In another embodiment the nuclear fuel pellets are treated in the two separated furnaces at different temperatures and the gas atmospheres in the two furnaces are independent of each other and the amounts of gas fed to each furnace are different.

The gas atmosphere in the reduction furnace has a humidity concentration different from the humidity concentration in the gas atmosphere in the sintering furnace.

In a further embodiment a gas mixture of $N_2$ and 4 to 8% $H_2$ is introduced into the reduction furnace to supply the gas atmosphere therein, and further a gas mixture of rare gas and 4 to 8% $H_2$ is introduced into the sintering furnace to supply the gas atmosphere therein.

In one method reducing gas is introduced in the reduction furnace to provide a reducing atmosphere and is discharged from the reduction furnace, and further the discharged gas is cooled to condense condensible constituents entrained by the gas in the reduction furnace, and the condensed constituents separated from the gas.

In accordance with the invention there is provided apparatus for sintering nuclear fuel pellets of nuclear fuel oxides and mixtures of nuclear fuel oxides having oxygen in stoichiometric excess of the dioxide includes an externally heated elongated reduction furnace, inlet means to the reduction furnace for the entrance of nuclear fuel pellets to be reduced, outlet means from the reduction furnace for the discharge of reduced pellets from the furnace, a gas inlet to the reduction furnace for the introduction of a reducing gas in the furnace to provide a reducing atmosphere around the pellets in the reduction furnace, a gas outlet from the reduction furnace for the discharge of gas therein, cooling means for cooling the reduced pellets, an intermediate station, a transport canal through which the cooled reduced pellets are transported to the intermediate station, a second transport canal for the transport of pellets in the intermediate station to the entrance of a sintering furnace, outlet means from the sintering furnace for the discharge of sintered pellets from the sintering furnace, a gas inlet to the sintering furnace, independent of the gas entering the reduction furnace, for the introduction of gas around the pellets in the sintering furnace, a gas outlet from the sintering furnace, independent of the gas discharge from the reduction furnace, for the discharge of gas therein, and cooling means for cooling the sintered pellets.

BRIEF DESCRIPTION OF THE DRAWINGS

Other features which are considered as characteristic for the invention are set forth in the appended claims.

Although the invention is illustrated and described herein as embodied in sintering nuclear fuel pellets, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which is diagrammatically illustrated the equipment for carrying out the present invention.

DETAILED DESCRIPTION OF THE INVENTION

The nuclear fuel pellets first travel through a reduction furnace with an adjustable velocity or dwelling time for adjusting the stoichiometry of the nuclear fuel oxides. The pellets are then taken in cooled-down condition to a checking station and pass subsequently through a sintering furnace with independently adjustable dwelling time or throughput velocity.

The reduction of such pressed blanks initially in stoichiometric excess of oxygen is accomplished, for example, in an externally heated muffle furnace, the temperature profile of which can be fitted by appropriately controlling individual heater circuits within wide ranges (100° to 1000° C.) to the temperature curve which is optimum for conducting the reaction as a function of various conditions (stoichiometric excess of oxygen, quantity of pressed blanks per unit time, shape of the pressed blanks, reactivity of the powders). In order to keep the water concentration low in accordance with the course of the reduction, additional gas injection stations are provided at different points. After leaving the muffle, the blanks can quickly be checked in the control station to determine whether the reduction has taken place completely. The check can be made, for example, optically; thus, the color hue of the pressed blanks gives information regarding the stoichiometric condition.

This has the advantage that it can be ascertained at an early stage of the operation whether the pressed blanks are sufficiently reduced. For example, in case of insufficient reduction of the blanks, defects would be produced in the sintering which would limit their usability. Such inadequately reduced pressed blanks might then even have to be scrapped as rejects.

A nitrogen/hydrogen mixture can be used as the reduction gas, which has considerable cost advantages over the use of a mixture of rare gas and hydrogen. A mixture of nitrogen and carbon monoxide may also be used as the reduction gas. Larger amounts of carbon monoxide as compared to hydrogen may be safely tolerated in the gas mixture. The hydrogen content in the gas mixture is usually 4 to 8% while the carbon monoxide content is 4 to 12%. The push-through velocity and the dimensions of the muffle can be matched optimally to the given reduction and material conditions. In particular, the push-through velocity is independent of the push-through velocity of the sintering furnace.

The extent of reduction of the pellets depends on a number of factors, including throughput or quantity of pellets fed to the furnace per unit time, velocity of the pellets through the furnace, length of the furnace, furnace temperature and gas composition. The effect of these factors on the pellets in the furnace could be referred to as exposure of the pellets to conditions in the furnace, which shall be designated as "residence time". Normally the dimensions of a furnace are fixed by previous design of the furnace. Also to some extent temperature variations are limited by previous design of the furnace. While gas compositions may be varied, in general, since the hydrogen content is not to materially exceed 8%, changes in the hydrogen content would be small. Usually in an operation, the temperature and gas composition are set and any variation or adjustment or regulation to obtain the desired reduction and sintering of the pellet is readily and conveniently accomplished by varying the velocity of the pellets through the furnace or by varying the throughput, i.e., increasing or decreasing the quantity of pellet passing through the furnace, or a combination of a change of velocity and a change of throughput.

Through the use of a closed, externally heated muffle, further advantages accrue due to the fact that the replacement of defective heater circuits is possible without the aggravating conditions of working with radioactively contaminated work pieces; that the gas flow conditions and the mass balance can be controlled better than in furnaces equipped with gas-permeable linings; and finally, that the decomposition products of the lubricant or/and the binder and lubricating agents are no longer condensed uncontrollably at colder points of the furnace jacket but are removed from the muffle with the hot gas. Through using nitrogen/hydrogen mixtures, the employment of electrostatic dust separators becomes furthermore possible, which remove, in addition to dust, also the decomposition products of the lubricating oil and/or of the binder and lubricating agents. Electrostatic separators cannot be used in the presence of argon (the cheapest rare gas), as argon is ionized already at the relatively high voltage and the separator then breaks down. A high degree of separation is necessary, however, as the furnace gas must be discharged to the outside air only via absolute filters.

The sintering of the reduced pressing blanks is performed, after they pass through an intermediate or checking station, in a resistance-heated furnace lined with highly refractory blocks.

As all or substantially all the reduction had previously been effected in the reduction furnace and no further reduction need take place, the reduction potential in the furnace can be adjusted to any required order of magnitude without effect on the preceding reduction. Overall, only a small quantity of a rare gas/hydrogen mixture is necessary for this purpose, as the material to be sintered is already reduced and no additional water is therefore generated. This is accompanied, in addition, by considerable cost advantages over the process technique customary heretofore.

By decoupling the reduction from the sintering, the length of the sintering furnace and the push-through velocity can be optimally matched to the operational requirements such as space required and maximum loading on the one hand and the requirements as to the sintered oxide such as, for example, a minimum dwelling time in the high-temperature zone.

The operation is best conducted with temperatures lower in the reduction furnace than in the sintering furnace. In general, the reduction furnace operates from about 700° C. to about 1000° C., preferably about 1000° C., and the sintering furnace operates at from about 1000° C. to about 1760° C., preferably about 1600° C. to 1700° C. The reduced pellets in the intermediate station wherein the pellets are held for checking or temporary storage or both are at a low temperature, preferably below 100° C., desirably about ambient temperature.

The equipment for carrying out the method is shown schematically in the drawing. The reduction furnace 3 is watercooled by passing cooling water through cooling coil 32 on the outside. The heater winding 31 is situated outside the furnace chamber proper, which is connected via the lines 33a, b and c to a source, not shown, of an $N_2/H_2$ gas mixture. The gas mixture leaves the furnace chamber via the line 34 and is then purified in a cleaning device 35. There, binder agents which may have been driven off are condensed and dust is separated electrostatically. The material to be sintered is loaded on transport boats, not shown, of highly heat-resistant material such as, for example, molybdenum and is placed at the inlet 1 into the transport canal 19 which goes through the whole installation. After the inlet 1, an input lock 2 is provided, which shuts the interior of the reduction furnace 3 against the outside atmosphere. After this furnace is traversed, an outlet rail 4 of similar design is provided again, which serves the same purpose. Ahead of it, this canal 19 is further provided with water cooling 12, which continues to cool the material to be sintered to room temperature after it has already cooled down in the furnace 3. After passing through the outlet lock 4, the transport boats arrive at a control station 5 which may also be designated as an intermediate storage station. There, it is ascertained, for example, that the reduction process performed in the furnace 3 has taken place properly. The intermediate storage station 5 makes possible, furthermore, different throughputs in the reduction furnace and in the following pushthrough furnace 7. The latter is again equipped with external water cooling means 72. The electric heater winding in sintering furnace 7, which makes possible sintering temperatures to maximally 1760° C., is located inside the furnace chamber proper. A mixture of argon and hydrogen with controllable water vapor content is fed-in and discharged via the lines 73 and 74. The locks 6 and 8 ahead of and behind the sintering furnace 7 ensure that no harmful atmosphere gets into the interior of the transport canal 19. The water cooling 13 of the transport canal 19 takes care of cooling the finished pressed bodies which leave the furnace in sintered condition. At the outlet 9 of the transport canal 19, the transport boats can then be taken from the furnace installation and the nuclear fuel pellets can be passed on for further processing, e.g., grinding.

The following examples illustrate the present invention:

EXAMPLE 1

Uranium oxide/Plutonium oxide powder mixtures with 2.2 stoichiometry (oxygen-to-metal ratio) are pressed without binder to form pressed bodies in the density range of 5.5 grams per $cm^3$. These pressed bodies are loaded into transport boats of molybdenum, each transport boat taking a pressed body weight of about 4 kg. These transport boats are then run into the reduction furnace 3 via the lock 2 as illustrated in the drawing.

The furnace has a temperature profile such that the temperature increases from room temperature in the first quarter of the furnace to 1000° C. This temperature is maintained over one-half the length of the furnace and then drops again to room temperature in the last quarter of the length.

A total gas quantity of 35 $m^3$ per hour of nitrogen with 8% hydrogen flows-in through the furnace via the lines 33a, b, and c. The humidity content in the entering gas is less than 10 ppm. The total gas quantity is fed into the furnace 3 in such a manner that 15 $m^3$ per hour flow in via the line 33a at the furnace exit and 10 $m^3$ per hour each are introduced into the hot zone by two further gas supply lines 33b and 33c.

The push-through or travel velocity of the transport boats is chosen so that about 12 kg $UO_2$ pressed bodies, i.e., 3 transport boats, get into or leave the furnace per hour. The humidity of the sinter gas leaving the furnace 3 in a collecting pipe 34 is measured continuously. If the former exceeds a value of 8000 vpm $H_2O$, an alarm is given and either the push-through velocity is reduced or a smaller amount of pressed bodies is loaded into the individual transport boats. After being cooled down to room temperature, the transport boats are removed from the furnace 3 and taken to the checking station or intermediate storage station 5. There, the stoichiometry is checked by sampling. If it is smaller than $UO_{2.05}$, the transport boats are placed in the sintering furnace proper 7 with a temperature higher than 1600° C. The push-through velocity through this furnace is controlled uniformly for all pressed bodies in such a manner that the residence times remain the same in the zone of the highest temperature and corresponds to the requirements desired for the nuclear fuel. Through this sintering furnace flows a gas mixture of argon and 8% hydrogen as well as an adjustable water content. This water content is adjusted so that the oxygen potential (hydrogen:water ratio) of the gas at the sintering temperatures is equal to the oxygen potential in the nuclear fuel pellets of the desired stoichiometry at the same temperature. The quantity of gas to be passed through is limited here to maximally 10 m³ per hour.

EXAMPLE 2

Uranium oxide/Plutonium oxide powders with 2.2 stoichiometry are pressed after the addition of binder and/or lubricating agents to form pressed bodies in the density range of about 5.6 grams per cm³ and after being pressed are loaded into the transport boats. Here, too, a pressed body weight of about 4 kg is loaded per boat, and the latter are then run into the reduction furnace 3.

The temperature profile of this furnace as well as the gas supply for the reduction process are the same as in Example 1. However, the push-through velocity is to be chosen in such a manner that the driving-out of the binder or lubricating agent does not lead to permanent damage at the pressed body. The upper velocity is determined simply by examining the pressed bodies at the intermediate station. The gas leaving the furnace 3 in the collecting pipe 34 is conducted through the device 35, where the binder and lubricating agent, which have been driven out and carried from the furnace by the hot gas stream, are precipitated. Likewise, dust separation of the gas stream by electrostatic means takes place there.

The further treatment of the pressed bodies is the same as in Example 1. The travel-through velocities will vary, as these depend on the composition of the nuclear fuel pellets as well as on their geometrical dimensions and can be readily determined. This procedure of separating reduction processes and the sintering proper allows one to adjust and maintain optimum operating conditions for both zones of heating, so that an end product of the highest possible quality is obtained.

There are claimed:

1. Method for sintering nuclear fuel pellets selected from the group consisting of nuclear fuel oxides and mixtures of nuclear fuel oxides having oxygen in stoichiometric excess of the dioxide in a reducing furnace atmoshpere, which comprises
   (a) passing the nuclear fuel pellets having a stoichiometric excess of oxygen through a heated reduction furnace with a reducing atmosphere to effect reduction of at least substantially all said oxygen in stoichiometric excess of the dioxide,
   (b) regulating the residence time of said nuclear fuel oxides in said reducing furnace to produce said reduced nuclear fuel oxides,
   (c) cooling said reduced nuclear fuel oxides,
   (d) passing said cooled-down nuclear fuel oxides to an intermediate station,
   (e) subsequently passing said cooled-down nuclear fuel oxides through a separate sintering furnace, and
   (f) independently regulating the residence time of the nuclear fuel oxides passing through the sintering furnace to effect sintering of the nuclear fuel pellets.

2. Method for sintering nuclear fuel pellets selected from the group consisting of nuclear fuel oxides and mixtures of nuclear fuel oxides having oxygen in stoichiometric excess of the dioxide in a reducing furnace atmosphere, which comprises
   (a) passing the nuclear fuel pellets having a stoichiometric excess of oxygen through a heated reduction furnace with a reducing atmosphere to effect reduction of at least substantially all said oxygen in stoichiometric excess of the dioxide,
   (b) regulating the residence time of said nuclear fuel oxides in said reducing furnace to produce said reduced nuclear fuel oxides,
   (c) cooling said reduced nuclear fuel oxides,
   (d) passing said cooled-down nuclear fuel oxides to an intermediate station,
   (e) subsequently passing said cooled-down nuclear fuel oxides through a separate sintering furnace,
   (f) independently regulating the residence time of the nuclear fuel oxides passing through the sintering furnace to effect sintering of the nuclear fuel pellets, and
   (g) wherein the nuclear fuel pellets are treated in the two separated furnaces at different temperatures and the gas atmospheres in the two furnaces are independent of each other and have different compositions.

3. Method for sintering nuclear fuel pellets selected from the group consisting of nuclear fuel oxides and mixtures of nuclear fuel oxides having oxygen in stoichiometric excess of the dioxide in a reducing furnace atmosphere, which comprises
   (a) passing the nuclear fuel pellets having a stoichiometric excess of oxygen through a heated reduction furnace with a reducing atmosphere to effect reduction of at least substantially all said oxygen in stoichiometric excess of the dioxide,
   (b) regulating the residence time of said nuclear fuel oxides in said reducing furnace to produce said reduced nuclear fuel oxides,
   (c) cooling said reduced nuclear fuel oxides,
   (d) passing said cooled-down nuclear fuel oxides to an intermediate station,
   (e) subsequently passing said cooled-down nuclear fuel oxides through a separate sintering furnace,
   (f) independently regulating the residence time of the nuclear fuel oxides passing through the sintering furnace to effect sintering of the nuclear fuel pellets, and
   (g) wherein the nuclear fuel pellets are treated in the two separated furnaces at different temperatures and the gas atmospheres in the two furnaces are independent of each other and the amounts of gas fed to each furnace are different.

4. Method according to claim 2, wherein the gas atmosphere in the reduction furnace has a humidity concentration different from the humidity concentration in the gas atmosphere in the sintering furnace.

5. Method according to claim 3, wherein the gas atmosphere in the reduction furnace has a humidity concentration different from the humidity concentration in the gas atmosphere in the sintering furnace.

6. Method according to claim 2, wherein the nuclear fuel pellets are cooled down to a temperature below 100° C. between the two furnaces.

7. Method according to claim 2, wherein a gas mixture of $N_2$ and 4 to 8% $H_2$ is introduced into the reduction furnace to supply the gas atmosphere therein, and wherein a gas mixture of rare gas and 4 to 8% $H_2$ is introduced into the sintering furnace to supply the gas atmosphere therein.

8. Method according to claim 2, wherein a gas mixture of $N_2$ and 4 to 12% CO is introduced into the reduction furnace to supply the gas atmosphere therein, and wherein a gas mixture of rare gas and 4 to 8% $H_2$ is introduced into the sintering furnace to supply the gas atmosphere therein.

9. Method according to claim 7, wherein the rare gas is argon.

10. Method according to claim 8, wherein the rare gas is argon.

11. Method according to claim 2, wherein the nuclear fuel pellets in the reduction furnace are heated to a temperature in the range of 700° C. to about 1000° C., and wherein the pellets in the sintering furnace are heated to a temperature in the range of about 1000° C. and 1760° C.

12. Method according to claim 3, wherein reducing gas introduced in the reduction furnace to provide a reducing atmosphere flows counter-current to the passage of nuclear fuel pellets therein, and the flow of gas relative to the passage of pellets regulated to limit the gas content of $H_2O$ at the furnace exit to 0.8% by volume $H_2O$.

13. Method according to claim 2, wherein the gas in the sintering furnace is additionally humidified up to a ratio of $H_2$: $H_2O$ in the gas of 10:1.

14. Method according to claim 2, wherein reducing gas is introduced in the reduction furnace to provide a reducing atmosphere and is discharged from the reduction furnace, and wherein the discharged gas is cooled to condense condensible constituents entrained by the gas in the reduction furnace, and the condensed constituents separated from the gas.

15. Method according to claim 14, wherein the gas discharged from the reduction furnace is passed through an electrostatic dust separator to remove dust particles contained in the gas.

16. Method according to claim 2, wherein reducing gas is introduced in the reduction furnace at a plurality of spaced points along the length of the furnace.

17. Method according to claim 2, wherein the pellets in the sintering furnace are internally heated and the outer wall of the sintering furnace externally cooled.

* * * * *